United States Patent
Singh

(10) Patent No.: US 7,933,932 B2
(45) Date of Patent: Apr. 26, 2011

(54) STATISTICS BASED DATABASE POPULATION

(75) Inventor: Surinder P. Singh, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 228 days.

(21) Appl. No.: 11/559,718

(22) Filed: Nov. 14, 2006

(65) Prior Publication Data

US 2008/0114801 A1    May 15, 2008

(51) Int. Cl.
*G06F 17/30* (2006.01)

(52) U.S. Cl. ......... 707/803; 707/638; 707/688; 707/809

(58) Field of Classification Search .................. 707/1, 3, 707/100, 101, 102, 104.1, 626, 638, 688, 707/776, 803, 809
See application file for complete search history.

(56) References Cited

U.S. PATENT DOCUMENTS

| | | | |
|---|---|---|---|
| 6,108,648 A * | 8/2000 | Lakshmi et al. ....... 707/999.002 |
| 6,263,345 B1 | 7/2001 | Farrar et al. |
| 6,311,181 B1 | 10/2001 | Lee et al. |
| 6,366,901 B1 | 4/2002 | Ellis |
| 6,477,523 B1 | 11/2002 | Chiang |
| 6,615,222 B2 * | 9/2003 | Hornibrook et al. .......... 707/200 |
| 6,691,099 B1 * | 2/2004 | Mozes ................. 707/2 |
| 6,801,903 B2 * | 10/2004 | Brown et al. ........... 707/2 |
| 6,912,547 B2 | 6/2005 | Chaudhuri et al. |
| 6,957,341 B2 * | 10/2005 | Rice et al. ........ 713/190 |
| 6,970,882 B2 * | 11/2005 | Yao et al. .............. 707/102 |
| 7,007,039 B2 | 2/2006 | Chaudhuri et al. |
| 7,047,230 B2 * | 5/2006 | Gibbons ............ 707/999.002 |
| 7,058,658 B2 | 6/2006 | Mentzer |
| 7,139,676 B2 * | 11/2006 | Barford ................ 702/183 |
| 7,155,428 B1 * | 12/2006 | Brown et al. ............. 707/4 |
| 7,278,056 B2 * | 10/2007 | Hekmatpour ........... 714/37 |
| 7,386,536 B1 * | 6/2008 | Ramesh et al. ........ 707/999.002 |
| 7,403,954 B2 * | 7/2008 | Bornhoevd et al. ........ 707/102 |
| 7,555,493 B2 * | 6/2009 | Khayter et al. ........ 707/999.102 |
| 2002/0049759 A1 | 4/2002 | Christensen |
| 2005/0125279 A1 * | 6/2005 | Wu ........................... 705/10 |
| 2005/0198074 A1 * | 9/2005 | Khayter et al. ............ 707/104.1 |
| 2005/0246390 A1 * | 11/2005 | House et al. ............... 707/200 |
| 2005/0262158 A1 * | 11/2005 | Sauermann .............. 707/200 |
| 2005/0289191 A1 | 12/2005 | Popivanov |
| 2006/0074875 A1 | 4/2006 | Faunce et al. |
| 2006/0085465 A1 * | 4/2006 | Nori et al. ................ 707/101 |
| 2006/0179075 A1 * | 8/2006 | Fay ....................... 707/102 |
| 2007/0011187 A1 * | 1/2007 | Chitgupakar et al. ....... 707/102 |
| 2007/0016603 A1 * | 1/2007 | Muras et al. .............. 707/102 |
| 2008/0046455 A1 * | 2/2008 | Behm et al. .............. 707/102 |

OTHER PUBLICATIONS

X. Wu, Y. Wang, Y. Zheng, "Privacy Preserving Database Application Testing", Published 2003 in "Proceedings of the 2003 ACM Workshop on Privacy in the Electronic Society", pp. 118-128.*

(Continued)

*Primary Examiner* — Tim T. Vo
*Assistant Examiner* — Dangelino N Gortayo
(74) *Attorney, Agent, or Firm* — Turocy & Watson, LLP

(57) ABSTRACT

The subject disclosure pertains to systems and methods that generate a simulation database based upon a source database. The simulation database can be populated using a schema and statistics obtained from the source database. After population, the simulation database can be statistically similar to the source database, facilitating testing, analysis, support and database design. More particularly, data distribution histograms can be used to generate data to populate the simulation database. At the same time, the referential integrity can be maintained.

20 Claims, 11 Drawing Sheets

OTHER PUBLICATIONS

Deshpande, A., et al.; Independence is Good: Dependency Based Histogram Synopses for High Dimensional Data; May 2001; 12 pages.

Gong, Y., et al.; Image indexing and retrieval based on color histograms; 2006; 2 pages.

* cited by examiner

Table 202:

| EMPL_ID | NAME | TITLE | DEPT_ID |
|---|---|---|---|
| 12345 | JOHN DOE | ASSOC. | 1445 |
| 10599 | MARY ROE | SR. ASSOC. | 1010 |
| 18445 | BOB SMITH | ASST. | 1445 |
| 18323 | TED JONES | INTERN | 1232 |
| 21000 | JANE THOMAS | ASSOC. | 8432 |

Table 200, 204:

| DEPT_ID | DEPT_NAME | LOCATION |
|---|---|---|
| 1010 | LEGAL | BLDG_101 |
| 1232 | RESEARCH | BLDG_315 |
| 1445 | MARKETING | BLDG_101 |
| 8432 | ACCOUNTING | BLDG_210 |
| 9991 | UNASSIGNED | BLDG_101 |

Table 206:

| LOCATION | ... | LABS |
|---|---|---|
| BLDG_101 | ... | NONE |
| BLDG_210 | ... | NETWORK |
| BLDG_315 | ... | CHEMICAL |

FIG. 2

STATISTICS BASED DATABASE POPULATION

BACKGROUND

Collection, maintenance and access to information are critical to numerous organizations including businesses, educational institutions, government agencies and the like. Typically, such organizations utilize databases to maintain and organize information. Databases are designed to store data to facilitate retrieval of relevant information in response to queries. For example, organizational databases can maintain customer information, employee records, product information, inventory and the like. Such databases can contain vast amounts of data including millions of individual data records and requiring significant storage to maintain.

The structure or organization of databases can be described in a plan or schema. There are several different types of schemas, including the relational type, where data is maintained in a set of tables that include relationships among the tables. Each table of a database includes a set of records with one or more data fields. For example, a database for a retail company can include a customer information table, where each record of the table represents a customer and the various fields of the record include customer name, address, credit information and most recent purchase information. Records within a table are also referred to as rows and fields can be referred to as columns. Relational databases are able to represent relationships between fields within separate tables, facilitating the retrieval of relevant information. Data can be retrieved from the set of tables based upon user-defined queries. Efficient design of the tables and their relationships can greatly increase the speed of data retrieval.

Maintenance, enhancement and modification of such databases can be challenging. Records or rows may be constantly updated, added and deleted. For example, customer data could be updated based upon new purchases, addition of new customers or, perhaps less frequently, removal of customers. In addition, as organizations or businesses change and grow over time, data requirements change. Consequently, fields or columns may be added, updated or deleted and/or relationships between tables may change. Maintenance of large databases requires constant modifications.

Database design and maintenance is an important and complex task, requiring a level of expertise. Frequently, organizations utilize outside experts to design and provide support for such databases. However, databases can contain critical and confidential data for the organization. Obtaining adequate database support while maintaining control over confidential information can be problematic.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the provided subject matter concerns facilitating database analysis, design and/or support. Many organizations utilize enormous, complex databases to store critical data and relationships. While such organizations may utilize employees to perform regular maintenance or updates, frequently outside experts design, update and/or support the complex database system. Such databases can be critical to performance of daily operations of the organization. Consequently, it may not be feasible to analyze or evaluate the database while the database is in use. Copying the database may be impractical due to the large volume of data. In addition, there may be security or privacy concerns in providing outside experts with copies of crucial organization information.

The systems and methods described herein can be utilized to facilitate database analysis, support and/or design by generating a simulation database, substantially statistically similar to the source database, but without copying the source data. This simulation database can be used to evaluate performance of the source database. Typically, databases maintain statistics describing the amount and distribution of data stored within the database. These statistics are used to optimize query response and are critical to analysis of database performance. The simulation database can be populated such that the statistics of the simulation database match the statistics of the source database without requiring copying of the actual source data. Consequently, performance of the simulation database should be virtually identical to that of the source database.

The schema and statistics can be used to generate the simulation database independently of the source database. For examples, outside database experts can be provided with one or more files containing the schema and statistics and need not access the source database and/or confidential information. In addition, the schema and statistics are generally significantly smaller than the entire source database, requiring less memory for storage and facilitating transmission or transportation.

During simulation database generation, the schema can be analyzed to determine database structure, data relationships (e.g., primary keys, foreign keys and indexes) and to determine order of data generation and table population. References or relationships between tables within the source database can be recreated to maintain the referential integrity of the simulation database. Each table can be generated in turn, adding records or rows to match the source database. Columns with associated distribution data (e.g., histograms) can be populated based upon the statistical distribution of data. If distribution data is not available for a column, the column can be filled with random data values based upon the column data type.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

BRIEF DESCRIPTION OF THE DRAWINGS

FIG. 2 depicts tables from an exemplary relational database.

DETAILED DESCRIPTION

Figure 1:
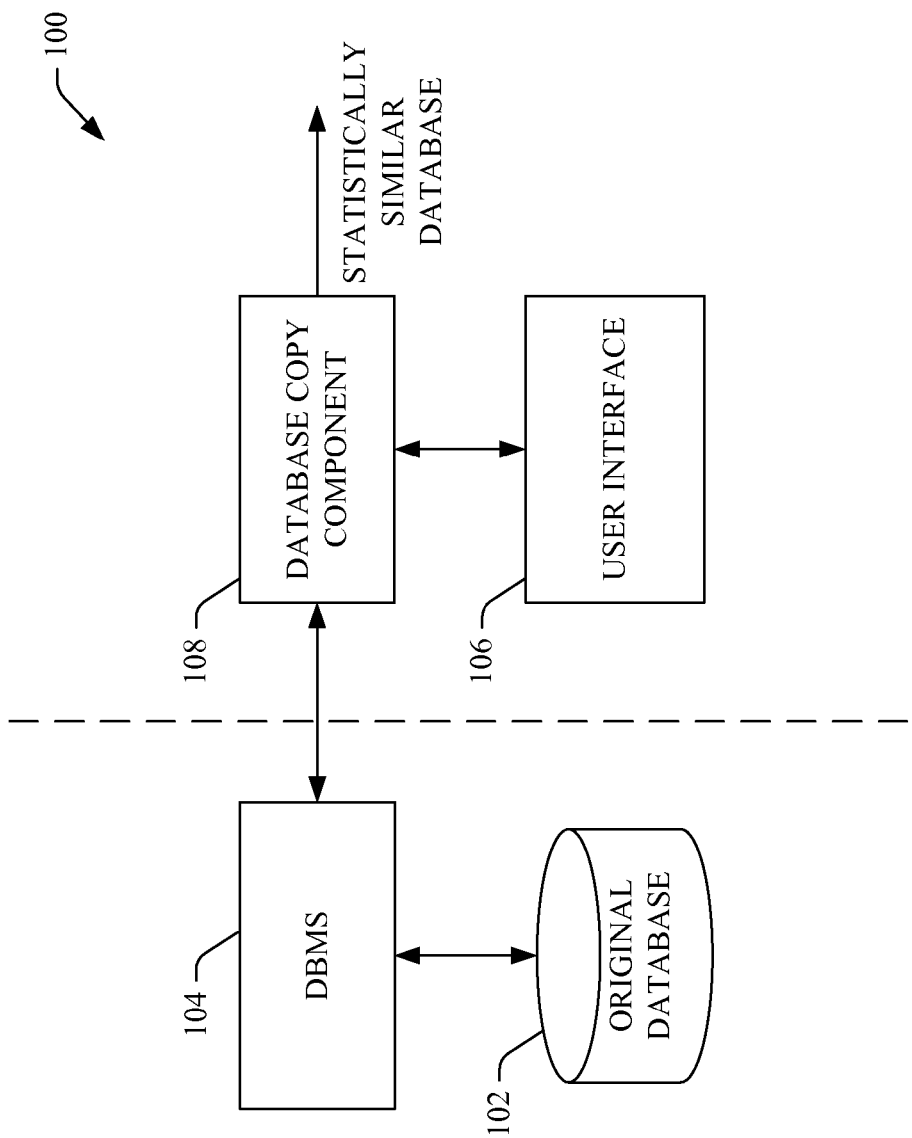
FIG. 1 is a block diagram of a system for generating a simulation database in accordance with an aspect of the subject matter disclosed herein.

The various aspects of the subject matter disclosed herein are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The word "exemplary" is used herein to mean serving as an example, instance, or illustration. The subject matter disclosed herein is not limited by such examples. In addition, any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Relational databases typically store data as a two-dimensional table of columns and rows. Data can be retrieved through user-defined queries, specified using a query language, such as Structured Query Language (SQL). Although, an SQL query specifies the data desired, it does not describe the process or procedure to be used to retrieve the data from the database. Typically, when a query is provided to a database, the database develops one or more possible execution procedures that could be utilized to obtain the relevant data based upon the query. Each procedure has a different associated cost based upon number of processing cycles required to retrieve the data. Database response to such queries is an important measure of database performance.

Generally, a database management system (DBMS) associated with a database attempts to select the optimal execution procedure based at least in part upon a set of statistics that describe the data contained within the database. The statistics may record the number of distinct values in particular columns, along with histograms of the values distributed across the columns. Additionally, statistics can include the number of rows within the individual tables of the database. Based upon these and other statistics, the DBMS can predict the cost associated with the various execution procedures, select the most efficient procedure and in some cases store the selected procedure. The procedure can be retrieved and reused if the query is repeated.

Data within the database is likely to change frequently as rows and even columns are added, deleted or modified. To ensure that the DBMS continues to select optimal execution procedures, the statistics should be regularly updated. Ideally, statistics could be updated each time the database is modified. However, complete statistics generation can be time-consuming. Consequently, statistics can be updated periodically or after specified number of changes. Updates are typically scheduled for periods of low database usage, such as off-peak hours.

Frequently database design, maintenance and support are based upon ensuring that the DBMS response to queries is optimized. Users may request assistance in increasing speed of data retrieval for specific queries. However, it may not be convenient or practical for database experts to access the actual database. If the experts are not employees of the organization that owns the database there may be confidentiality concerns. For example, certain government organizations may require security clearances prior to accessing the database. Additionally, it may not be feasible to allow experts to access the database during business hours, delaying ordinary business operations.

Database analysis and support can be enhanced by the creation of a simulation database statistically similar to the source database. The simulation database can be used to recreate the statistic-based performance of the database while preventing outside experts from accessing the data contained within the source database. Experts can evaluate query performance, execution procedures and modifications to database structure utilizing the simulation database without affecting the source database. The simulation database can be created and/or populated independent of the source database, based upon the source database schema and statistics. Because the model database has the same statistical characteristics as the original database, performance should be virtually identical.

Referring now to FIG. 1, a system 100 that generates a simulation database that is substantially statistically identical to an original database 102 is illustrated. The system 100 can obtain database information from a database management system (DBMS) 104 of an original database 102. Information can include a schema that describes the organization of the original database 102 as well as certain statistics regarding the data contained within the original database 102. More particularly, the statistics can include one or more histograms describing distribution of data within the database 102. The system 100 can request such database information directly from the DBMS 104. Alternatively, the database information can be stored in a file or files and provided separately to the system 100. The system 100 can be co-located with the original database 102 and DBMS 104 or remotely located and completely independent of the original database 102 and DBMS 104.

The database information, including a schema and statistics, may be significantly smaller than the actual database. For example, database information for a large multi-terabyte database may be stored in file in just a few megabytes. Consequently, the database information can be easily transmitted or transported offsite from the original database 102 for use by the system 100. Database support centers may maintain multiple sets of schemas and statistics for customers. The schemas and statistics can be used to generate simulated copies of original databases as needed, without requiring the massive amounts of storage necessary to store duplicates of original databases.

The system 100 can include a user interface 106 that allows a user to select an original database 102 or schema and statistics from which the simulation database will be generated. The user interface 106 can be a graphical interface to facilitate user selection of available databases and simulation options. Alternatively, the user interface 106 can be implemented as a simple command line interface.

A database copy component 108 can utilize the database information, including schema and statistics, to generate a statistically similar database. An empty database can be provided, or alternatively, the database copy component 108 can create a new database based upon the schema. The schema for the newly created simulation database should be identical to that of the original database. The data for the simulation database can be generated based upon the statistics from the original database 102. Consequently, the resulting database may not contain the actual data from the original database 102, but should be substantially statistically identical.

As a result of the statistical similarity, the newly generated and/or populated simulation database should be virtually identical to the original database 102 in response to query optimization. Actual data from the original database 102 is not required to evaluate the database itself. Therefore, the simulation database can be analyzed in place of the original database 102 to evaluate possible problems, analyze modifications and the like.

The database copy component 108 can also be used to generate a selected table or tables of the original database 102. It may not be necessary to reproduce or simulate the entire original database. Particular tables can be selected via a user interface 106. The selected tables can be populated in accordance with original database statistics.

Referring now to FIG. 2, an exemplary set of tables 200 for a relational database is illustrated. Database tables can contain millions of records; the tables 200 of FIG. 2 are illustrated with a minimal number of records and fields for brevity. The set of tables 200 may describe business information for an exemplary corporate database. Here, an employee table 202 includes five rows or records and four columns or fields of data. A separate department table 204 includes five rows and three columns describing various departments within the organization. Finally, a third table 206 with three rows and at least three columns or data fields describes corporate locations or sites. One or more columns are omitted from the third table 206 for brevity.

The database tables 200 can include one or more keys that identify rows within the tables. For example, the EMPL_ID field provides a unique identifier for each employee and can be used as a key for the employee table 202. Keys can be based upon a single column or a combination of columns within a table. In general, statistics are kept regarding distribution of data within key columns of tables.

Relational database tables can also include foreign keys that represent relationships between tables. A foreign key is a column or group of columns that point to a key within a separate table. For example, the DEPT_ID column within the employee table 202 is a foreign key corresponding to the DEPT_ID key within the department table 204. Typically, a foreign key refers to a primary key of another table, referred to as the parent table. Foreign keys link information within the set of tables.

In general, referential integrity should be maintained among the database tables. Referential integrity in a relational database refers to consistency between tables. A foreign key within a table should contain only values that appear within the referenced key from the parent table. For example, each entry within the DEPT_ID column of the employee table 202 should correspond to an entry within the department table 204.

One or more indexes can be defined for each of the database tables. Typically, indexes allow the DBMS to locate data within the database without requiring the DBMS to search through the entire table. Each entry within an index can include a pointer to the corresponding location in the table. Indexes can be implemented using trees, linked lists and the like. For example, the database can include an index based upon the NAME column of the employee table 202 to facilitate retrieval of employee records based upon employee name. If the name index is not present, the DBMS will perform a full table scan starting at the beginning of the table and stepping through each row, search for the specified name value. Generally, a DBMS will maintain statistics regarding data distribution for the column or columns upon which an index is based to facilitate query optimization.

Both indexes and keys can be generated using combinations of columns. For example, an index could be created dependent upon TITLE and DEPT_ID columns within the employee table 202. Such an index could be used to identify department heads within the organization. Generally, statistics can be maintained on all columns within the index, or alternatively, statistics can be maintained for a single column of multi-column indexes. Similarly, keys can be generated using combinations of one or more columns to uniquely identify rows or records.

Figure 3:
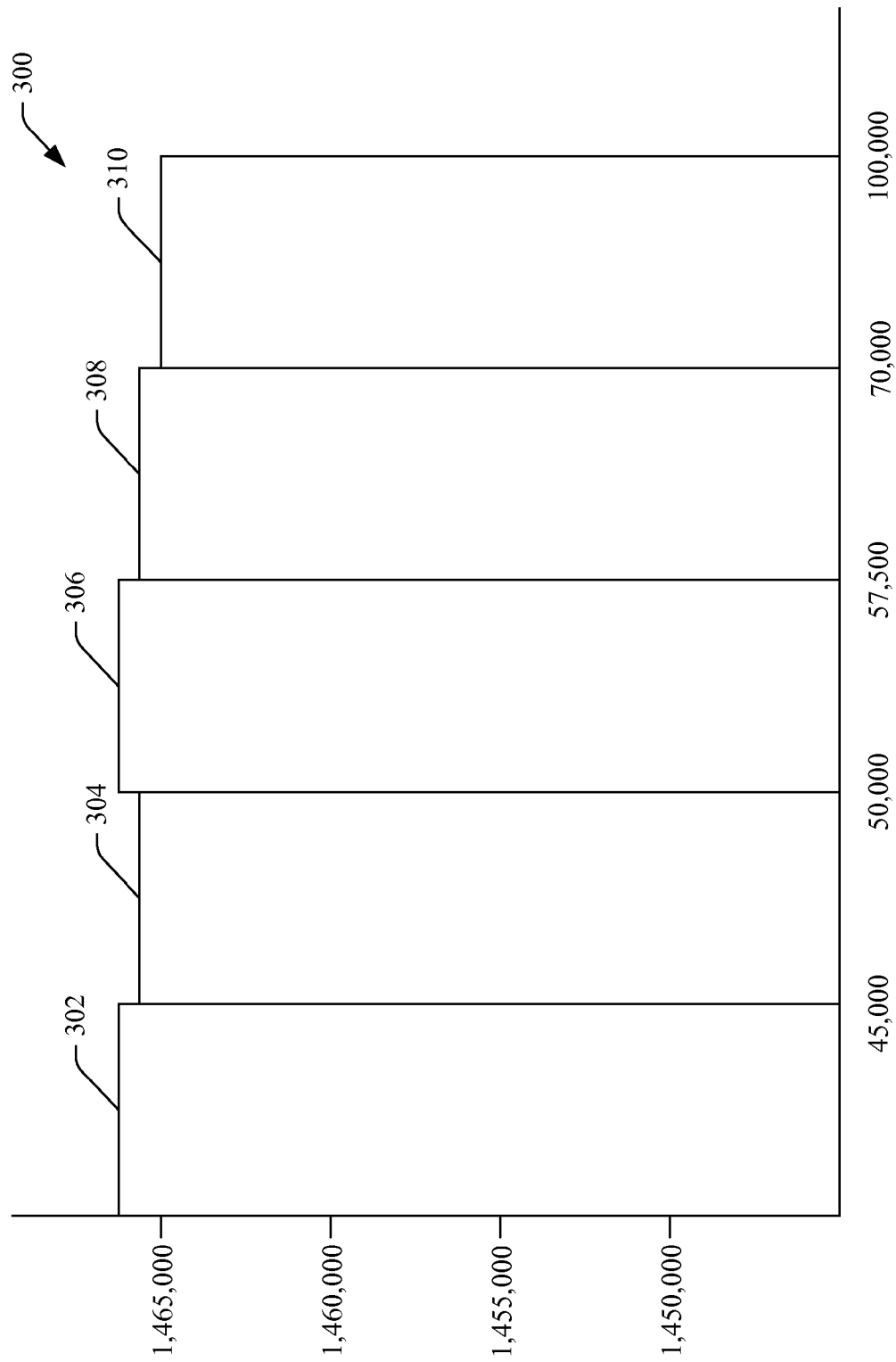
FIG. 3 depicts an exemplary histogram.

FIG. 3 represents an exemplary data distribution histogram 300. Typically, statistical information regarding the distribution of values within columns of database tables is maintained by the DBMS. The statistical distribution information is usually utilized for query optimization. A histogram is a graphical display that represents the number of instances of values that fall within a predefined set of ranges or categories. Here, each column of values 302-310 within a histogram 300 indicates a range of values for a column of a database table. The histogram columns are referred to herein as steps. The height of the steps 302-310 is representative of the number of rows within the data that fall within the range of values.

For the example histogram 300 illustrated in FIG. 3, each step 302-310 represents a range of integer values. For example, the first step 302 represents values 0-45,000, the second step 304 represents values 45,001-50,000, the third step 306 represents values 50,001-57,500, the fourth step 308 represents values 57,501-70,000 and the fifth step 310 represents values 70,001-100,000. Here, the possible range of values has been subdivided such that the number of rows that fall within each subdivision are approximately equal. In particular, the database includes approximately 1,466,000 records or rows for each step 302-310.

The histogram 300 illustrated in FIG. 3 is based upon ranges of integer values. However, histogram steps can be based upon characters, strings, enumerated values, floating point values or any other data type. For instance, if the histogram represented distribution data for a column with an English character data type, the first step could include characters a, b, and c, the second step could include characters d, e, and f and so forth.

Each step of the histogram can include additional information regarding the distribution of values for the corresponding column of the database table. For example, step information can include the maximum value or upper bound of the step, the number of table rows equal to the maximum value, as well as the total number of table rows between the maximum value of the step and the previous step. Additionally, the statistics can include the number of distinct values that exist between the upper bound of a step and the previous step. For example, with reference to FIG. 3, for the second step 304 there are 5,000 possible values between the upper bound (50,000) and the previous step (45,000).

The DBMS can maintain additional statistics for the database aside from distribution or histogram data. For example, statistics can include the total number of rows for each table within the database. In addition, the statistics may indicate the date at which the statistics were generated as well as whether the database has been updated since the last statistical generation. Statistics may be obtained by sampling across data pages of the database rather than fully scanning each table. If the statistics are generated by sampling, a sampling factor can be maintained that indicates the percentage of records sampled to generate the distribution data or histograms.

Figure 4:
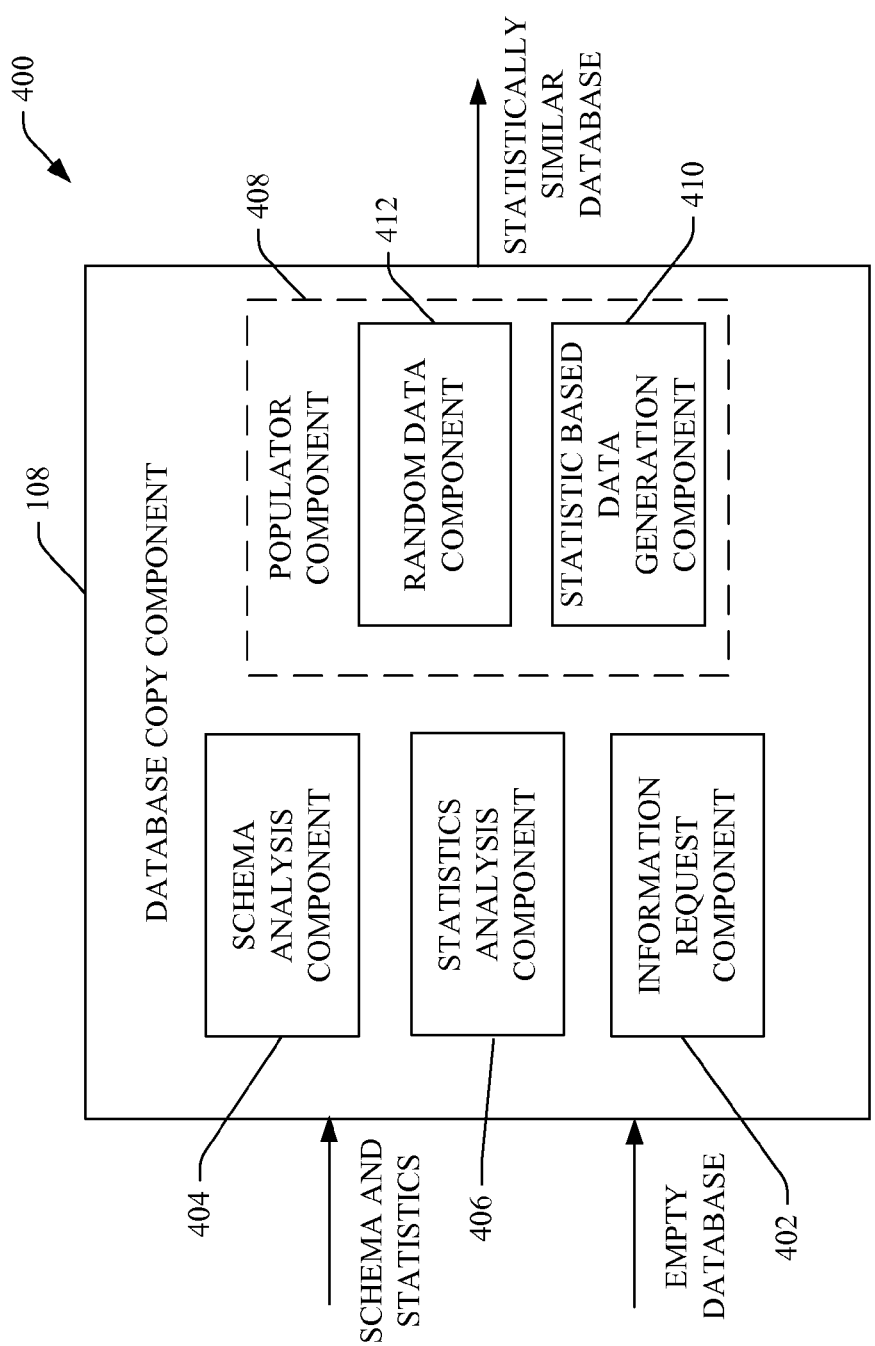
FIG. 4 is a detailed block diagram of a system for generating a simulation database in accordance with an aspect of the subject matter disclosed herein.

Referring now to FIG. 4, a detailed block diagram of a database copy component 108 that generates a simulation database is illustrated. As shown, the database copy component 108 can receive a schema and statistics describing the original database. In addition, the database copy component 108 can include an information request component 402 that is capable of retrieving schema and statistics information from a DBMS and database or from one or more files. The information request component 402 is capable of analyzing a database and generating a schema describing the structure of the database as well as retrieving the most recent available statistics. The schema can include information regarding tables, keys, indexes, constraints, views and full text indexes for the database. The schema and statistics can also be saved to one or more files and utilized later.

Additionally, the database copy component 108 can receive an empty database to be populated based on an original database. If the provided database is not empty, the resulting simulation database may be inaccurate. Alternatively, the database copy component 108 can analyze the provided database and delete any extraneous data. After analysis of the input and population of the simulation database, the database copy component 108 can output a statistically similar database for use by developers, testers and the like.

A schema analysis component 404 can evaluate the schema for the original or source database. Generation and/or population of the simulation database can be based upon this schema analysis. In particular, the schema analysis (e.g., identification of parent child table relationships) can affect the order of table population. Typically, parent tables should be populated prior to child tables to ensure that referential integrity is maintained during the population process.

A statistics analysis component 406 can determine available statistics for each table and evaluate table-specific statistics to determine the order in which the table is to be populated. In particular, the statistics analysis component 406 can identify those columns for which histogram data is available. If multiple histograms are available for a column, a single histogram can be identified for use during population. Additionally, the statistics analysis component 406 can perform basic verification of histogram data. For example, the statistics analysis component 406 can compare the total number of rows for each table to the number of data entries within the histograms. Errors or inconsistencies can be presented to users via a user interface and adjustments can be performed to compensate for such inconsistencies.

The database copy component 108 can include a populator component 408 that populates the rows and columns of a table of the simulation database in accordance with the schema and statistics. The populator component 408 can include a statistic-based data generation component 410 used to populate table columns for which histogram data is available. In particular, the statistic-based data generation component 410 can generate data values for each row represented in every step of the histogram. For instance, for a particular step, the statistic-based data generation component 410 can determine the number of rows within the step and generate a data value for each row. The generated data values can be distributed evenly within the range of values of the step.

Data values can be generated for any data type (e.g., numeric, strings, enumerated and binary). For numerical data types (e.g., integers, floating point numbers, decimals and the like), it is relatively straightforward to subdivide the range of values represented by the step and generate the appropriate values. When data generated between steps is equally spread, the likelihood of generating data matching the source histogram is very high. The generated values can also be evenly distributed for enumerated data types, such as the English alphabet. Alternatively, any distribution of values within the boundaries of the step can be utilized.

Simulation of non-numerical data types can be more complicated. To facilitate data generation, all non-numeric data types can be treated as strings of characters, referred to herein as strings. To generate string data values, the next lexically distinct value can be selected, rather than attempting to generate an even spread of values across a step. While this strategy simplifies data generation, the generated data is less likely to match the source statistics. Additionally, this strategy can result in duplicate keys, foreign key violations and may limit full population as sampled in the source histogram.

String data values can also be generated based upon a user-specified source file of terms or words to be used during population. Combinations of randomly selected terms from the source file can be used to generate data values. The string data values can be filled to their maximum length or to user-defined lengths. Alternatively, a random number generator can be used to create variable length strings.

Histogram data may not be available for every column within the database. In such cases, data can be randomly generated within the constraints of possible values. The random data can be used to populate the column. In particular, a random data component 412 can evaluate the data type of the column to be populated. The random data component 412 can utilize a random number generator to generate numeric values. Any algorithm for random number generation can be utilized. A seed for random number generation can be based upon current time, user input or any other value. For other data types, the output of the random number generator can be translated to the appropriate data type. Alternatively, a set of sequential data values or data values obtained from a user specified source file could be used to populate such columns.

Certain scenarios or database configurations can complicate production of statistically identical databases. For example, multi-column keys, particularly foreign keys, can be difficult to duplicate. Frequently, distribution data is maintained only for the first column of a multi-column key. For a multi-column foreign key, the first column of the multi-column foreign key must be synchronized with data from the parent table on which it depends in addition to the distribution data corresponding to the first column. Additional columns of the multi-column foreign key should be based upon the corresponding values in the parent table to maintain referential integrity.

Multiple indexes or histograms referencing a single column can also result in complicate population strategies. A single histogram can be selected for use in population of the simulation database. However, if a single histogram is selected, other histograms may be inconsistent. Although the actual spread of data for the database column would be consistent among the histograms, the steps of the selected histogram and the other histograms may be inconsistent. For example, a first histogram may divide the possible range of values evenly using 10 steps, while the second histogram may utilize 20 steps for the same range of values. While the data represented is identical, the histograms appear very different.

The following examples illustrate complex population scenarios. An exemplary database illustrates one situation in which data distribution for an index may be ignored:

```
CREATE TABLE t1 (
    a int primary key,
    b int,
    c varchar(10)
)
CREATE TABLE t2 (
    a int,
    b int,
    c float,
    CONSTRAINT PRIMARY KEY CLUSTERED
    (
        a, b
    ),
    CONSTRAINT "FK_t2" FOREIGN KEY
    (
        a
    ) REFERENCES t1
    (
        a
    )
)
CREATE INDEX "t2ind"
ON t2
(
    a
) ON [PRIMARY]
GO
```

Here, a first table 't1' is created including three columns t1.a, t1.b and t1.c. Column t1.a serves as the primary key for the table. A second table 't2' includes three columns t2.a, t2.b and t2.c, with a multi-column primary key, t2.a and t2.b. Column t2.a is also a foreign key referencing column t1.a of table t1. The exemplary database also includes an index 't2ind' based upon column t2.a.

Here, the index t2ind and its associated data distribution statistics may be ignored during population of column t2.a. Generally, the parent table, t1, will be populated first. Any keys or indexes, such as t1.a, can be populated based upon data distributions or histograms. The remaining columns, t1.b and t1.c, can be populated with random data. Next, the primary key of table t2 would be populated based upon the corresponding data distribution. In this case, the primary key is a multi-column key, t2.a and t2.b. In addition, column t2.a is a foreign key that references column t1.a of table t1. Consequently, the primary key distribution data or histogram as well as the generated contents of column t1.a would be used to populate column t2.a. Index t2ind histogram data regarding column t2.a may be ignored. The primary key histogram may be preferred to the index histogram.

Histogram data for indexes that reference foreign keys may be ignored. In the following exemplary database, the index histogram would be ignored in favor of the foreign key histogram.

```
CREATE TABLE t1 (
    a int,
    b int,
    c varchar(10),
    CONSTRAINT PRIMARY KEY CLUSTERED
    (
        a, b
    ),
)
CREATE TABLE t2 (
    a int,
    b int,
    c int,
    d int,
    e varchar(10)
    CONSTRAINT PRIMARY KEY CLUSTERED
    (
        a, b, c
    ),
    CONSTRAINT "FK_t2" FOREIGN KEY
    (
        c, d
    ) REFERENCES t1
    (
        a, b
    )
)
CREATE INDEX "t2ind"
ON t2
(
    d
) ON [PRIMARY]
GO
```

Here, a first table 't1' is created with a multi-column primary key, t1.a and t1.b. A second table 't2' includes five columns t2.a, t2.b, t2.c, t2.d and t2.e. Columns t2.a, t2.b and t2.c form the primary key of table t2. In addition, columns t2.c and t2.d form a multi-column foreign key that references the primary key of table t1, t1.a and t1.b. In addition, an index t2ind references column t2.d of table t2.

The t2ind index histogram may be ignored during populating of column t2.d of table t2. Column t2.d is part of a multi-column foreign key that references columns t1.a and t1.b of table t1. Typically, there will be histogram data maintained for column t2.d as part of the foreign key. Values for columns t2.c and t2.d will have to be selected to maintain referential integrity between table t1 and t2. Consequently, t2ind histogram data may be ignored.

Order of columns within a table, a foreign or in indexes can affect use of available distribution data in populating database tables. Generally, multi-column objects (e.g., keys and indexes) may result in minor inconsistencies in histograms. However, columns can be reordered or manipulated to optimize database population based upon the schema.

Frequently, data distributions are maintained only for the first column of multi-column keys. Therefore, for population purposes, the first column should be populated based upon data distribution and the remaining columns may be randomly populated. In the case of multi-column foreign keys, the first column may be populated in accordance with the histogram and the table that it references. Additional columns may be populated based upon the referenced table to maintain referential integrity. This is illustrated in the following example:

```
CREATE TABLE t1 (
    a int,
    b int,
    c varchar(10),
    CONSTRAINT PRIMARY KEY CLUSTERED
    (
        a, b
    ),
)
CREATE TABLE t2 (
    a int,
    b int,
    c int,
    d int,
    e varchar(10)
    CONSTRAINT PRIMARY KEY CLUSTERED
    (
        a, b
    ),
    CONSTRAINT "FK_t2" FOREIGN KEY
    (
        d, c
    ) REFERENCES t1
    (
        a, b
    )
)
CREATE INDEX "t2ind"
ON t2
(
    d
) ON [PRIMARY]
GO
```

Here, a first table 't1' is created with a multi-column primary key, t1.a and t1.b. A second table 't2' includes five columns t2.a, t2.b, t2.c, t2.d and t2.e. Columns t2.a, t2.b and t2.c form the primary key. Columns t2.d and t2.c form a multi-column foreign key that references the primary key of table t1, t1.a and t1.b. In addition, an index 't2ind' references column t2.d.

Once again, the t2ind index histogram will not be utilized to populate the simulation database. Here, the order of the multi-column foreign key of table t2, t2.d and t2.c, has been reversed from the previous example. The declaration of the foreign key dictates that column t2.c should be populated first and then a value for column t2.d should follow column t2.c. Index t2ind may be ignored. Accordingly, the histogram associated with index t2ind may not be matched in the simulation database.

There may be other situations in which an index cannot be matched exactly. The order of columns within a table, foreign keys as well as indexes drive many of the populating decisions during creation of the simulation table. However, the simulation database may still be useful in simulating behavior of the original database.

For certain database systems, a high proportion of null data within the source database can affect the accuracy of the simulation database. Null data may not be included within the statistics maintained for the source database. Accordingly, it may be difficult to populate the simulation database with the correct number of null data entries.

Figure 5:
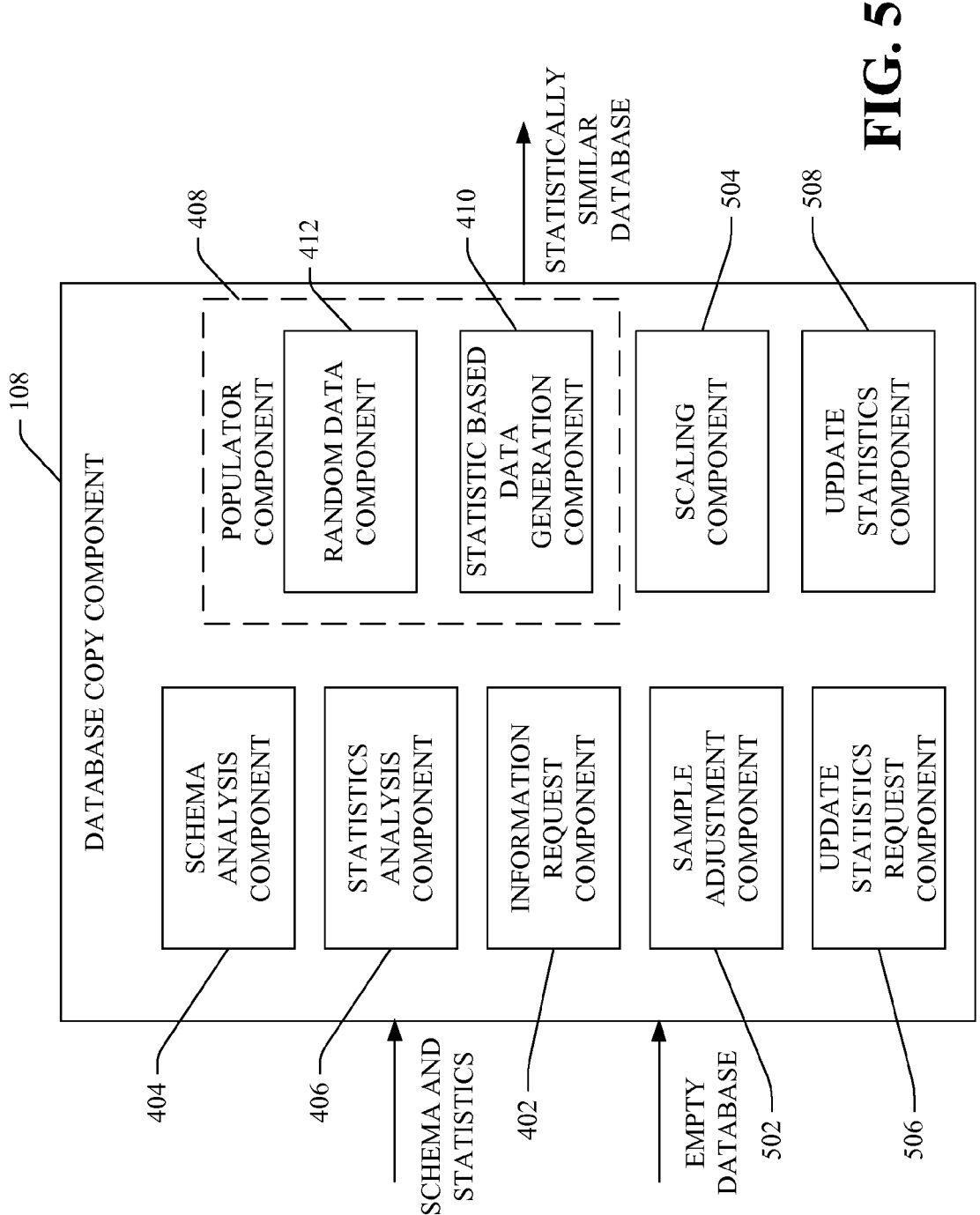
FIG. 5 is a more detailed block diagram of a system for generating a simulation database in accordance with an aspect of the subject matter disclosed herein.

Referring now to FIG. 5, a more detailed block diagram of a database copy component 108 for generating a simulation database is illustrated. Generally, statistic generation is time consuming and computationally expensive procedure. To reduce processing time statistics can be generated by sampling the data maintained within the database, rather than scanning each data entry. Although sampled statistics are less accurate than a full scan of the database, sampled statistics are more easily obtained and may be sufficient for most purposes. Sampled statistics can be provided to the database copy component 108 along with a sampling factor indicative of the sampling rate. A sample adjustment component 502 can modify the sampled statistics based upon the sampling rate to populate a simulation database that is statistically similar to the source database. However, use of sampled statistics may reduce the accuracy or reliability of the simulation database.

The database copy component 108 can also include a scaling component 504 to manipulate the size of the simulation database. Reproduction of the entire original database may be unnecessary. A scaled model of the original database may suffice for many purposes. The scaling component 504 can reduce the size of the statistically similar database by a user-selected scaling factor. Alternatively, the scaling factor can increase the size of the simulation database, simulating database growth. The resulting simulation database should be consistent with the statistics of the original database, but increased or reduced by the scaling factor. In particular, the table columns would remain the same, but the number of rows can be multiplied by the scaling factor.

An update statistics request component 506 can request generation of updated statistics from the original database. The update statistics request component 506 can contact a selected DBMS and database to obtain the most recent statistics or request generation of updated statistics based upon a sampled or full scan of the database. Requests for updated statistics may be based upon length of time since the previously provided statistics were generated. For example, the update statistics component 506 may request updated statistics if the available statistics are more than three months old. The update request statistics component 506 can ensure that the database copy component 108 has the best available data from which to generate the simulation database.

Once the simulation database has been populated, an update statistics component 508 can generate a set of statistics for the newly generated simulation database. Prior to use, the simulation database will require a set of statistics for query optimization. Accordingly, the update statistics component 508 can scan the simulation database and produce a set of statistics. The update statistics component 508 can perform a full scan or a sampled scan of the simulation database. The resulting statistics should be substantially identical to the statistics for the original database.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Additionally, it should be noted that one or more components may be combined into a single component providing aggregate functionality or divided into several sub-components. The components may also interact with one or more other components not specifically described herein but known by those of skill in the art.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

Figure 6:
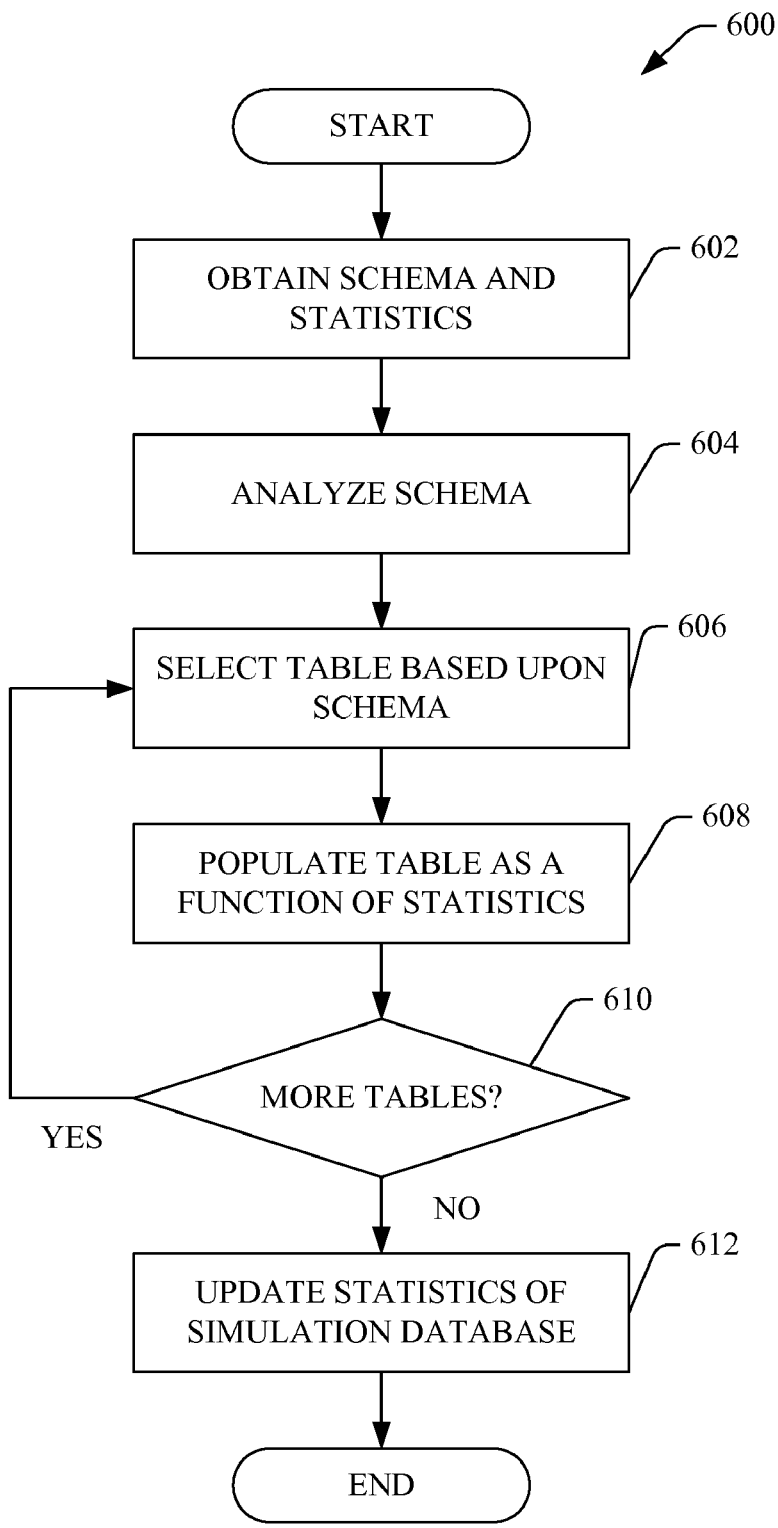
FIG. 6 illustrates a methodology for generating a statistically similar database in accordance with an aspect of the subject matter disclosed herein.

Referring now to FIG. 6, a methodology 600 for generating a simulation database statistically similar to a source database is illustrated. At 602, a schema and statistics for the source database is obtained. The schema and statistics can be obtained from the DBMS and database upon request. Alternatively, schema and statistics can be provided, such that the simulation database can be populated without requiring contact with the source database, allowing remote creation of the simulation database. In addition, an empty database can be obtained or created for population as the simulation database.

The schema of the source database can be analyzed at 604. During analysis, tables and relationships among the tables can be identified and analyzed. At 606, a table can be selected for population based at least in part upon the analysis of the schema. For example, parent tables should be populated prior to their children to maintain referential integrity among the tables. The selected table can be populated based at least in part upon the statistics of the source database at 608. Any columns for which statistical data is not available can be populated using random data. Table population is described in more detail below.

After the selected table is populated, a determination is made as to whether there are additional tables to populate at 610. If there are additional tables, the process continues at 606 where the next table is selected. If all of the tables have been populated, the process continues at 612, where the statistics for the simulation database are generated. Once the statistics for the simulation database have been generated, the simulation database is ready for use.

Figure 7:
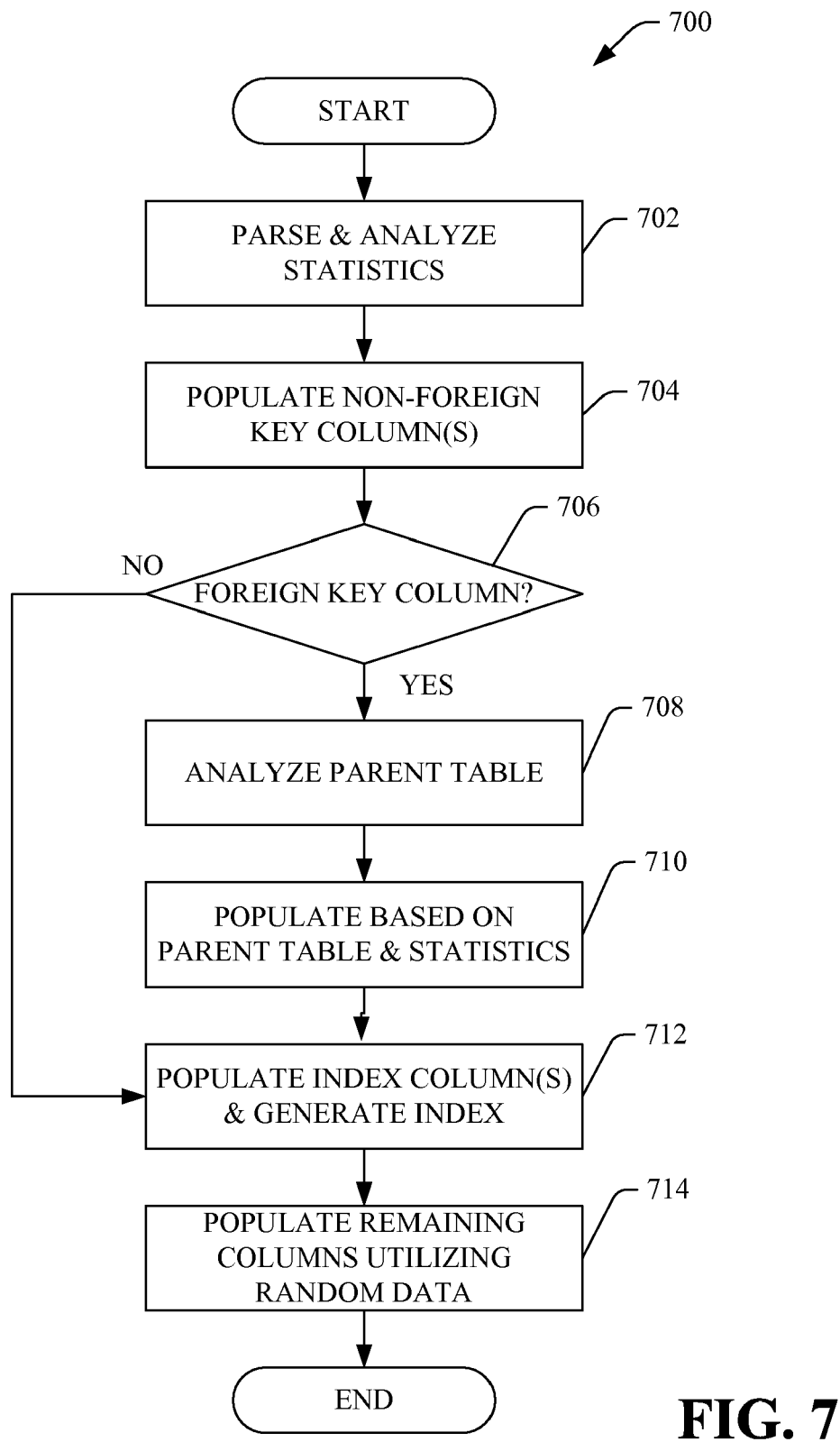
FIG. 7 illustrates a methodology for generating a statistically similar database table in accordance with an aspect of the subject matter disclosed herein.

Turning now to FIG. 7, a methodology 700 for populating a table of a simulation database is illustrated. At 702, statistics corresponding to the table to be populated can be parsed, analyzed and evaluated. In particular, data regarding distribution of data within table columns, such as histograms, can be identified and analyzed in preparation for populating the columns of the table. At 704, key columns within the table, other than foreign keys, can be populated based upon their corresponding distribution data or histogram. In particular, data entries are selected such that the resulting table will be statistically, virtually identical to the original database.

At 706, a determination is made as to whether there are any foreign keys within the table. If yes, the foreign keys can be processed. First, the parent table referenced by the foreign key is identified and the parent table data referenced by the foreign key column is analyzed at 708. The foreign key column is populated based upon both the data from the parent table as well as the distribution data or histogram associated with the foreign key column at 710. It is critical that the referential integrity be maintained between the table being populated and the parent table. Therefore, the foreign key column should be populated only with values maintained within the parent table. If the histogram for the foreign key column indicates values that are not included within the parent table, the closest available parent table value should be utilized. Although, foreign keys may affect the statistics for the newly generated database, the overall impact may be minimal. It is more important that referential integrity be maintained.

After population of any foreign keys, columns that are referenced by indexes can be populated at 712. Such index columns are likely to have associated distribution data, such as histograms. Each index column can be populated based upon the provided distribution data. It is possible that an index column will already have been populated, if the column referenced by the index is part of a key or another index. In this case, the histogram associated with the current index may be ignored. In addition, an index structure corresponding to the index column can be generated based upon index column values. Finally, any remaining columns without applicable distribution data can be populated utilizing random data at 714.

Figure 8:
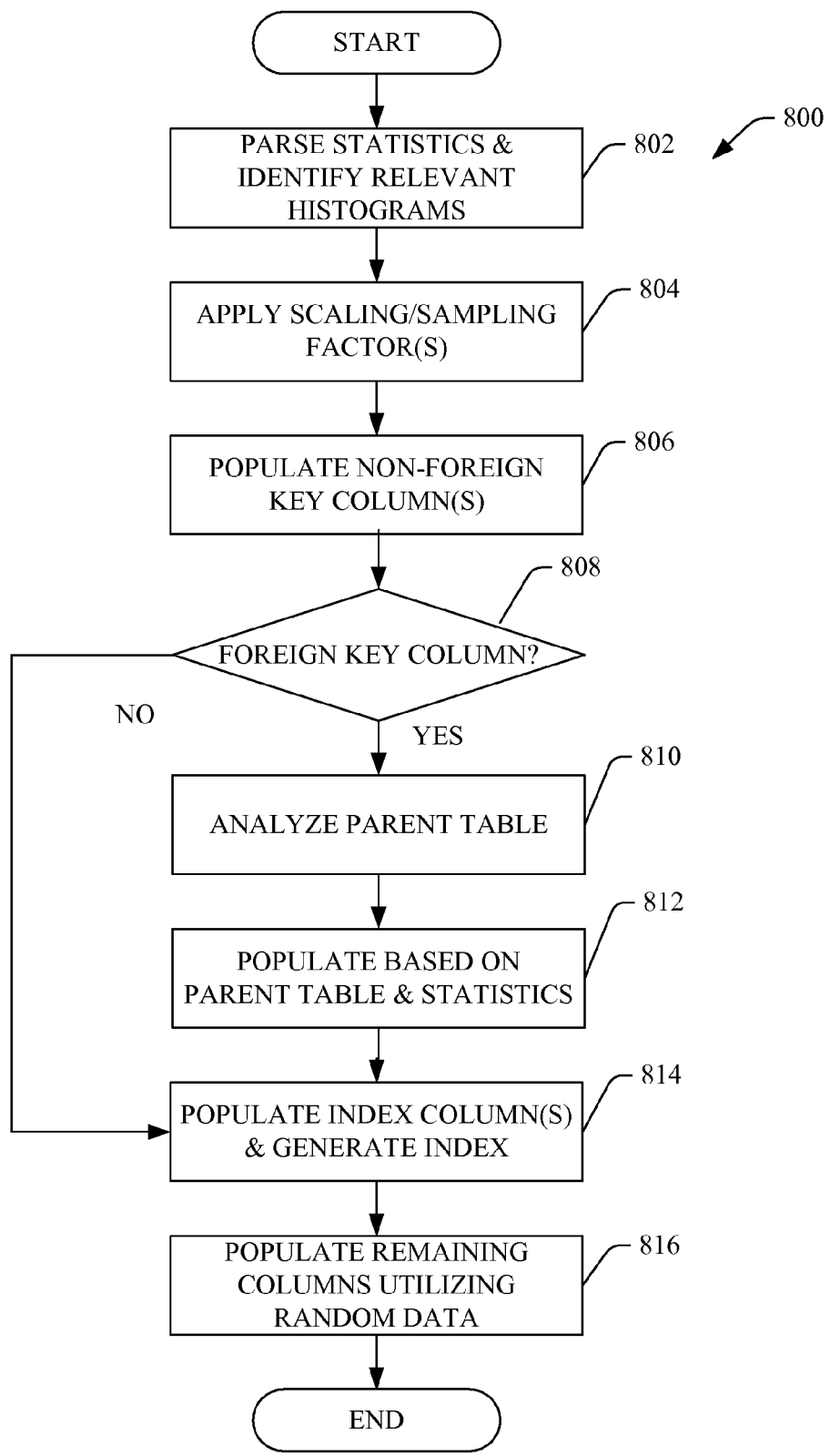
FIG. 8 illustrates a methodology for generating a statistically similar database table utilizing sampling and/or scaling in accordance with an aspect of the subject matter disclosed herein.

Referring now to FIG. 8, a methodology 800 for generating a simulation database table utilizing sampling and/or scaling is illustrated. Use of sampled statistics may affect generation of data for a simulation database. In particular, the sampled statistics should be scaled based upon the appropriate sampling factor. Similarly, scaling of the simulation database should also affect use of the statistics in populating tables for the new database. At 802, statistics corresponding to the table to be populated can be parsed, analyzed and evaluated. In particular, data regarding distribution of data within table columns, such as histograms, can be identified and analyzed in preparation for populating the columns of the table. At 804, a scaling and/or sampling factor can be applied to the statistics. In the case of sampled statistics, a sampling factor can be applied to approximate statistics resulting from a full-scan of the original database. To produce a scaled simulation database, a scaling factor can be applied to statistics to reduce or increase the size of the tables and therefore the resulting database. It is conceivable that sampled statistics could be used to generate a scaled simulation database. In which case, the sampling factor could be applied to the statistics and then a scaling factor. Use of sampling and/or scaling can reduce the statistical accuracy of the resulting simulation database.

At 806, key columns, other than foreign keys, can be populated based upon their statistics as adjusted by the sampling and/or scaling factor(s). In particular, data entries are generated such that the resulting table will be statistically, virtually identical to the statistics original database or a scaled model thereof.

At 808, a determination is made as to whether there are any foreign keys within the table. If yes, the foreign keys can be processed. First, the parent table referenced by the foreign key is identified and the parent table data referenced by the foreign key column is analyzed at 810. The foreign key column is populated based upon both the data from the parent table as well as the sampled or scaled statistics at 812. It is critical that the referential integrity be maintained between the table being populated and the parent table. Therefore, the new column should be populated only with values maintained within the parent table. If the histogram for the foreign key column indicates values that are not included within the parent table, the closest available parent table value should be utilized. Although, the foreign key columns may affect the statistics for the simulation database, the overall impact may be minimal. It is more important that referential integrity be maintained.

After population of any foreign keys, columns that are referenced by indexes can be populated at 814. Such index columns are likely to have associated sampled or scaled distribution data, such as histograms. Each index column can be populated based upon the provided distribution data. It is possible that an index column may already have been populated, if the column referenced by the index is part of a key or another index. In this case, the histogram associated with the current index may be ignored. In addition, an index structure corresponding to the index column can be generated based upon index column values. Finally, any remaining columns for which no distribution data has been provided can be populated utilizing random data at 816.

Figure 9:
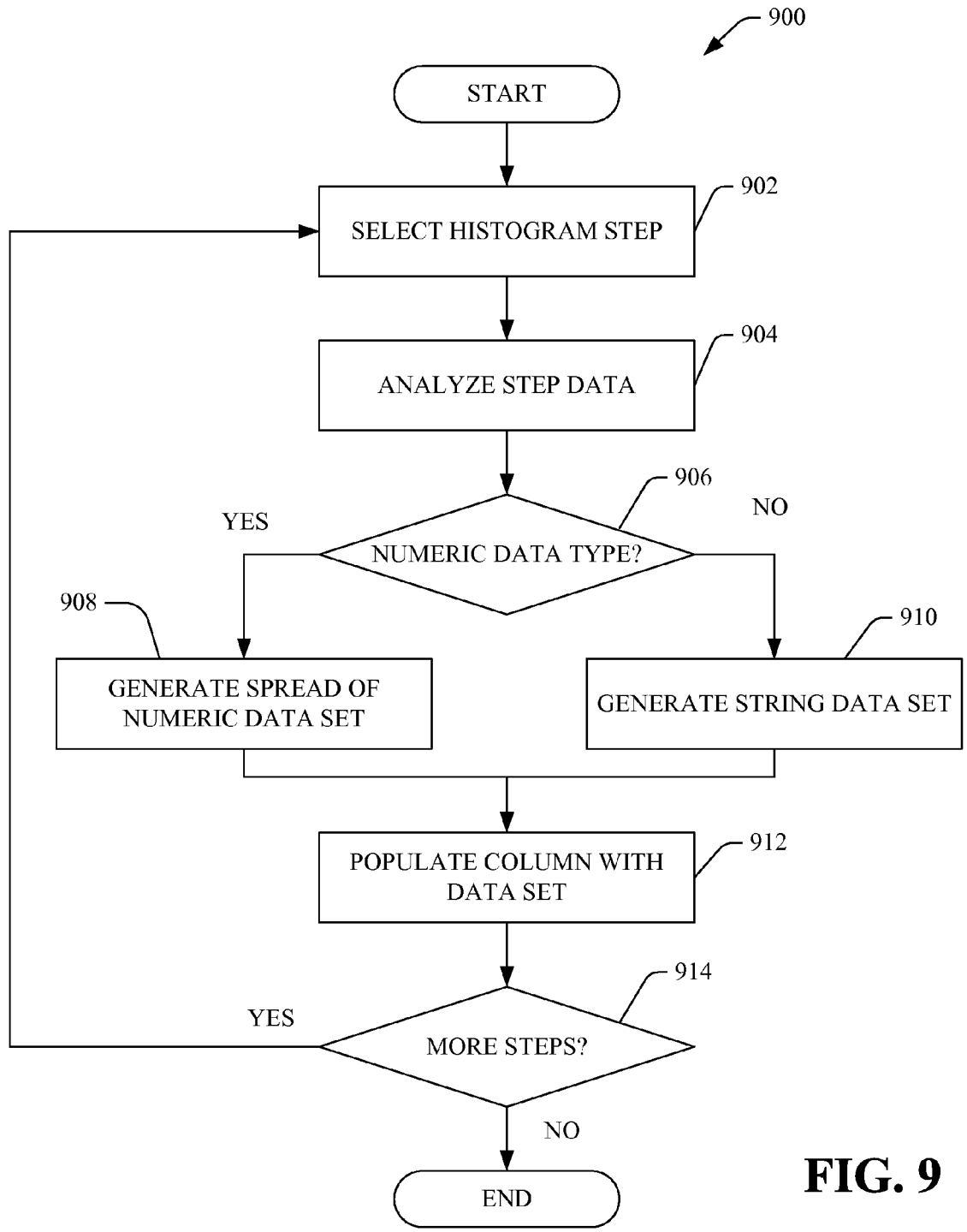
FIG. 9 illustrates a methodology for populating a column based upon distribution data in accordance with an aspect of the subject matter disclosed herein.

Referring now to FIG. 9, a methodology 900 for populating a column based upon distribution data, such as a histogram, is illustrated. At 902, a step of the distribution histogram is selected for processing. The selected step is evaluated at 904 to determine the bounds of the step as well as the number of data entries within the step. At 906, a determination is made as to whether the data type of the column is numerical (e.g., integer, floating point and the like). If the data type is numerical, data entry values can be generated, such that the values will be evenly spread between the bounds of the step at 908. A set of data values equal to the number of data entries within the step are generated. If the step includes additional information, such as number of entries equal to the maximum bound of the step, the values can be generated to comply with such information.

If the data type is not numerical, a set of values can be generated at 910 based upon a string data type. For simplicity, all other data types can be treated as strings. Each data entry can be generated as the next lexicographic value within the bounds of the step. After a set of data entry values is generated, whether numeric or other data type, the values can be entered into the data table at 912. At 914, a determination is made as to whether there are additional steps within the histogram. If yes, the process returns to 902, where the next step is selected for evaluation. If no, the process terminates.

Figure 10:
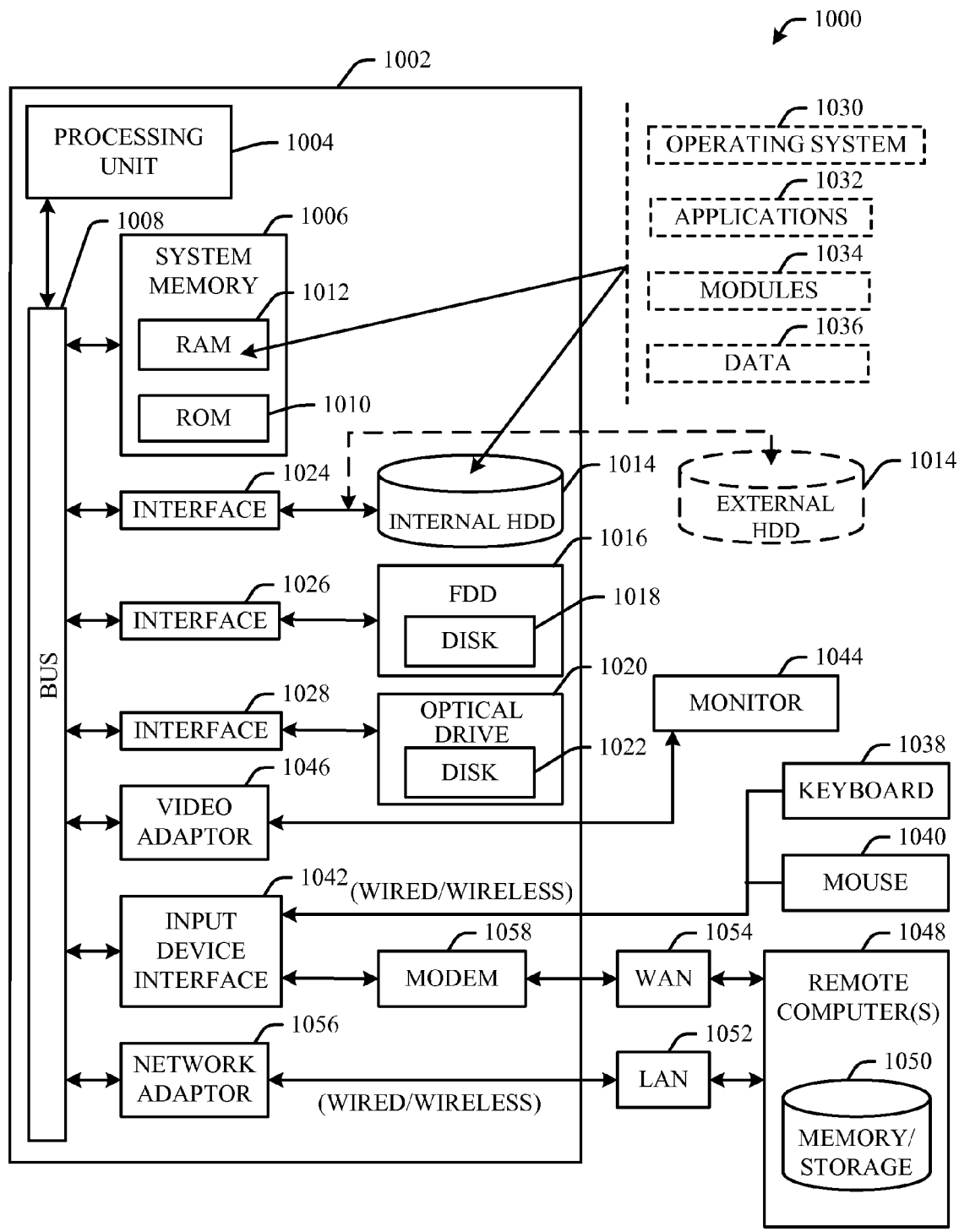
FIG. 10 is a schematic block diagram illustrating a suitable operating environment.
Figure 11:
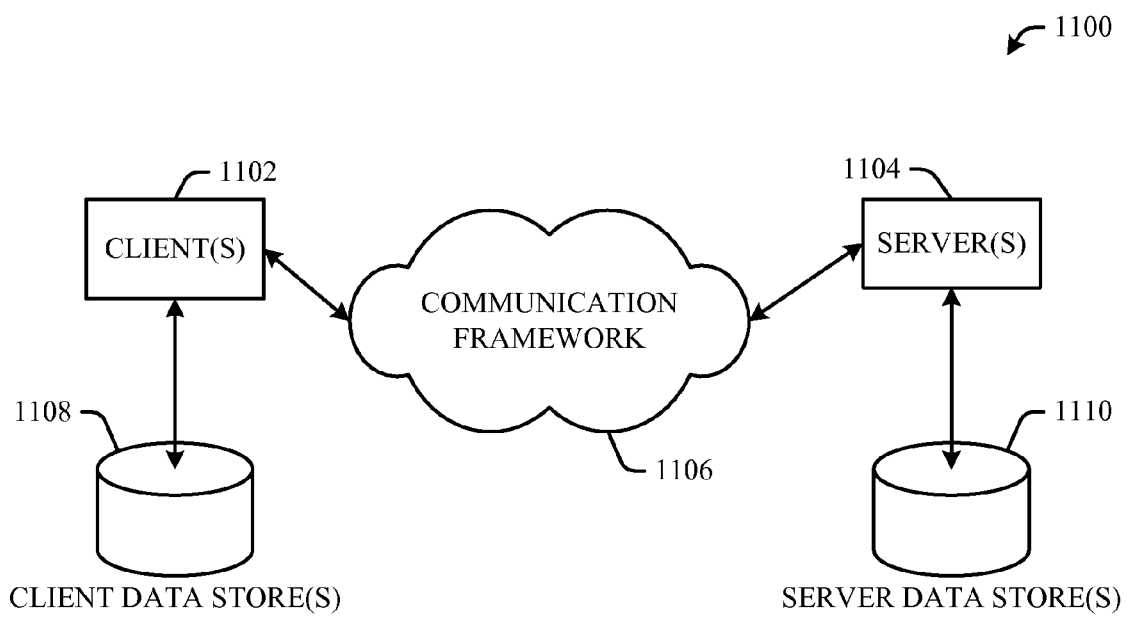
FIG. 11 is a schematic block diagram of a sample-computing environment.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the system and methods disclosed herein also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics (e.g., personal media players, television set top boxes, digital video recorders, video game systems) and the like. The illustrated aspects may also be practiced in distributed computing environments where tasks are performed by remote processing devices that are linked through a communications network. However, some, if not all aspects of the systems and methods described herein can be practiced on stand-alone computers. In a distributed computing environment, program modules may be located in both local and remote memory storage devices.

With reference again to FIG. 10, the exemplary environment 1000 for implementing various aspects of the embodiments includes a mobile device or computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer or mobile device 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1194 interface technologies. Other external drive connection technologies are within contemplation of the subject systems and methods.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods for the embodiments of the data management system described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the systems and methods can be implemented with various commercially available operating systems or combinations of operating systems.

A user can enter commands and information into the computer 1002 through one or more wired/wireless input devices, e.g. a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1194 serial port, a game port, a USB port, an IR interface, etc. A display device 1044 can be used to provide a set of group items to a user. The display devices can be connected to the system bus 1008 via an interface, such as a video adapter 1046.

The mobile device or computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g. a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adaptor 1056 may facilitate wired or wireless communication to the LAN 1052, which may also include a wireless access point disposed thereon for communicating with the wireless adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, PDA, communications satellite, any piece of equipment or location associated with a wirelessly detectable tag (e.g. a kiosk, news stand, restroom), and telephone. The wireless devices or entities include at least Wi-Fi and Bluetooth™ wireless technologies. Thus, the communication can be a predefined structure as with a conventional network or simply an ad hoc communication between at least two devices.

Wi-Fi allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

FIG. 11 is a schematic block diagram of a sample-computing environment 1100 with which the systems and methods described herein can interact. The system 1100 includes one or more client(s) 1102. The client(s) 1102 can be hardware and/or software (e.g. threads, processes, computing devices). The system 1100 also includes one or more server(s) 1104. Thus, system 1100 can correspond to a two-tier client server model or a multi-tier model (e.g., client, middle tier server, data server), amongst other models. The server(s) 1104 can also be hardware and/or software (e.g., threads, processes, computing devices). One possible communication between a client 1102 and a server 1104 may be in the form of a data packet adapted to be transmitted between two or more computer processes. The system 1100 includes a communication framework 1106 that can be employed to facilitate communications between the client(s) 1102 and the server(s) 1104. The client(s) 1102 are operably connected to one or more client data store(s) 1108 that can be employed to store information local to the client(s) 1102. Similarly, the server(s) 1104 are operably connected to one or more server data store(s) 1110 that can be employed to store information local to the servers 1104.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A system that facilitates database analysis, comprising:
a processor configured to execute computer executable components stored in memory, the components including:
a schema analysis component configured to analyze a schema that describes organization of a source database;
a statistics analysis component configured to analyze a first set of statistics that describes at least distribution of data maintained by the source database;
a database copy component configured to provide a destination database based, at least, upon the schema and generate representative data entries based, at least, on the first set of statistics and independently of the data from the source database, wherein a second set of statistics that describes data maintained by the destination database is equivalent to the first set of statistics that describes the data maintained by the source database;
a populator component configured to identify a foreign key column in the source database, and populate a corresponding foreign key column in the destination database at least, in part, as a function of a parent table in the source database and the first set of statistics; and
a random data component configured to generate random data entries for the at least one destination column of the destination database based, at least, on a determination that histogram data is not available from the at least one data distribution histogram for the at least one destination column of the destination database, wherein the at least one data distribution histogram is based, at least, on the source database, and a structure of the destination database is created based, at least, on the at least one data distribution histogram.

2. The system of claim 1, wherein the first set of statistics that describes the data maintained by the source database includes at least one data distribution histogram associated with at least one source column of the source database.

3. The system of claim 2, further comprising:
a histogram data component configured to generate histogram data entries for at least one destination column of the destination database as a function of the at least one data distribution histogram, the at least one destination column corresponding to the at least one source column with which the at least one data distribution histogram is associated.

4. The system of claim 1, wherein a scaling component is configured to adjust a number of rows of the destination database based, at least, upon a scaling factor.

5. The system of claim 1, further comprising a sample handler component configured to adjust a number of rows of the destination database based, at least, upon a sampling factor used in generation of the first set of statistics that describe the data maintained by the source database.

6. The system of claim 1, further comprising an interface configured to receive an identification of the source database and direct generation of the data entries for the destination database.

7. The system of claim 1, further comprising a statistics request component configured to analyze the source database and obtain the schema and the first set of statistics that describe the data maintained by the source database.

8. The system of claim 1, further comprising a statistics update component configured to update the second set of statistics for the destination database.

9. A method for generating a simulation database for use in database analysis, comprising:
employing a processor to execute computer readable instructions stored in a computer readable medium to perform the following acts, comprising:
receiving and analyzing a set of statistics representing at least distribution of data of an original database and a schema for the original database;
generating a simulation database according to the schema;
populating at least one table of the simulation database with values generated independently of the data of the original database and as a function of the set of statistics, wherein the values are associated with statistics that are equivalent to the set of statistics of the original database;
identifying a foreign key column in the original database;
populating a corresponding foreign key column in the simulation database based, at least, in part, on data of a parent table in the original database and the set of statistics; and
determining that histogram data is not available for a destination column of the simulation database from a data distribution histogram; and
generating random data entries for the simulation database based, at least, on the determination that histogram data is not available, wherein the data distribution histogram is based, at least, on the original database, and a structure of the simulation database is created based, at least, on the data distribution histogram.

10. The method of claim 9, wherein the receiving the set of statistics includes receiving distribution data for at least one original column of a table of the original database, the at least one original column corresponding to a simulation column of the at least one table of the simulation database.

11. The method of claim 10, wherein the populating comprises:
identifying the at least one original column with the distribution data; and
populating the simulation column as a function of the distribution data.

12. The method of claim 11, further comprising populating at least one other simulation column with random data if the distribution data is inapplicable to the at least one other simulation column.

13. The method of claim 11, wherein the populating the simulation column as a function of the distribution data comprises:
analyzing a plurality of steps of the distribution data;
generating a plurality of data entry sets for the plurality of steps based, at least, in part, upon a number of rows within the plurality of steps;
adding the plurality of data entry sets for the plurality of steps to the simulation database.

14. The method of claim 9, further comprising, for a multiple-column foreign key:
populating a first column of a corresponding table in the simulation database in accordance with a histogram that references a parent table in the original database; and
populating additional columns of the multiple columns based on a referenced parent table.

15. The method of claim 9, wherein the populating the at least one table of the simulation database includes:

generating data values for numerical data types based on an even distribution of a range of values represented by a histogram step; and generating data values for non-numerical data types by generating string data values, wherein the generating the string data values includes selecting a next lexically distinct value.

16. The method of claim 9, wherein the populating the at least one table of the simulation database includes applying a sampling factor corresponding to sampling during generation of the set of statistics.

17. The method of claim 9, further comprising:
analyzing the original database; and
generating the schema and the set of statistics as a function of the analyzing the original database.

18. The method of claim 9, further comprising:
receiving input identifying at least one file containing the schema and the set of statistics; and
parsing the at least one file to obtain the schema and the set of statistics.

19. The method of claim 9, further comprising generating other statistics associated with the destination database.

20. A computer-readable storage medium storing instructions, that, in response to execution, cause at least one computing device to perform operations, comprising:
analyzing a source database to obtain a schema of the source database and a set of statistics associated with data of the source database, wherein the set of statistics includes statistical data representing at least distribution of the data;
analyzing the schema;
analyzing the set of statistics;
generating a destination database based, at least, upon the schema;
populating the destination database with one or more data entries generated based, at least, on the set of statistics and independently of data in the source database, wherein statistics of the destination database are equivalent to the set of statistics of the source database;
for a multi-column foreign key:
synchronizing a corresponding first column of the destination database with data of a parent table on which the multi-column foreign key depends; and
populating at least one additional column of the multi-column foreign key based, at least, on corresponding data of the parent table;
determining that histogram data is not available for a destination column of the destination database from a data distribution histogram; and
generating random data entries for the destination database based, at least, on the determination that histogram data is not available, wherein the data distribution histogram is based, at least, on the source database, and a structure of the destination database is created based, at least, on the data distribution histogram.

* * * * *